United States Patent
O'Bryan et al.

(10) Patent No.: US 8,982,354 B2
(45) Date of Patent: Mar. 17, 2015

(54) SUBSURFACE MOTORS WITH FIBER OPTIC SENSORS

(71) Applicant: Baker Hughes Incorporated, Houston, TX (US)

(72) Inventors: Suresha R. O'Bryan, Cypress, TX (US); Ketankumar K. Sheth, Tulsa, OK (US); Risa Rutter, Claremore, OK (US); Michael Forsberg, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/971,521

(22) Filed: Aug. 20, 2013

(65) Prior Publication Data

US 2014/0159550 A1   Jun. 12, 2014

Related U.S. Application Data

(63) Continuation-in-part of application No. 13/314,010, filed on Dec. 7, 2011, now Pat. No. 8,537,364.

(51) Int. Cl.
| | | |
|---|---|---|
| *G01N 21/00* | (2006.01) | |
| *H02K 11/00* | (2006.01) | |
| *H02K 5/132* | (2006.01) | |
| *G01M 15/00* | (2006.01) | |
| *G01D 5/353* | (2006.01) | |

(52) U.S. Cl.
CPC .............. *H02K 11/001* (2013.01); *H02K 5/132* (2013.01); *G01M 15/00* (2013.01); *G01D 5/35316* (2013.01)

USPC .......................................................... 356/446

(58) Field of Classification Search
CPC ....... E21B 47/123; E21B 36/04; E21B 43/24; E21B 47/06; E21B 47/065; E21B 43/2401; E21B 17/028; E21B 36/001; E21B 36/02; E21B 43/243; E21B 43/26; E21B 41/0064; E21B 43/12; E21B 47/0006
See application file for complete search history.

(56) References Cited

U.S. PATENT DOCUMENTS

| | | | |
|---|---|---|---|
| 6,888,124 B1 | 5/2005 | Smith | |
| 6,913,079 B2 | 7/2005 | Tubel | |
| 7,208,855 B1 | 4/2007 | Floyd | |
| 2002/0196994 A1* | 12/2002 | Bosselmann et al. | 385/12 |
| 2003/0236626 A1 | 12/2003 | Schroeder et al. | |
| 2004/0141420 A1 | 7/2004 | Hardage et al. | |
| 2007/0041019 A1 | 2/2007 | Schmidt | |
| 2007/0272406 A1 | 11/2007 | McCoy et al. | |
| 2009/0065202 A1 | 3/2009 | Brown et al. | |
| 2011/0002795 A1* | 1/2011 | Brookbank | 417/63 |
| 2011/0061862 A1* | 3/2011 | Loretz et al. | 166/250.11 |
| 2011/0139447 A1 | 6/2011 | Ramos et al. | |
| 2012/0026482 A1 | 2/2012 | Dailey | |
| 2012/0073804 A1 | 3/2012 | Harman et al. | |
| 2012/0179378 A1* | 7/2012 | Duncan et al. | 702/8 |

* cited by examiner

*Primary Examiner* — Michael P Stafira
(74) *Attorney, Agent, or Firm* — Shawn Hunter (57) ABSTRACT

Subsurface motors for use with electrical submersible pump which include one or more optic fiber sensors to detect operational parameters of the motor such as temperature, vibration and pressure. Optic fiber sensors are disposed a ally along a pathway within unsealed portions of the motor.

10 Claims, 7 Drawing Sheets

SUBSURFACE MOTORS WITH FIBER OPTIC SENSORS

BACKGROUND OF THE INVENTION

1. Field of the Invention

The invention relates generally to subsurface motors of the type that are used within electrical submersible pumps (ESP's). In particular aspects, the invention relates to techniques for monitoring operational parameters of such motors using fiber optics.

2. Description of the Related Art

Electrical submersible pumps (ESPs) are routinely used in the production of hydrocarbon from wells. A typical ESP includes a downhole motor that converts the mechanical power to operate a pump and associated components, such as a gas separator. Downhole motors include a stator and a rotor that is rotationally moveable with respect to the stator. A housing surrounds the stator and rotor.

Conventionally, optic fibers have been placed within an ESP motor by disposing them either entirely outside of the motor (i.e., mounted outside of the motor housing) or within a sealed area of the motor such as the winding compartment, which is filled with epoxy or varnish sealant. The use of fiber optic sensors within the sealed winding chambers of the stator of the motor is discussed in U.S. Patent Publication no. 2011/0002795 by Brookbank. Because U.S. Patent Publication no. 2011/0002795 is owned by the assignee of the present application, U.S. Patent Publication no. 2011/0002795 is herein incorporated by reference in its entirety. In Brookbank, the optic fibers are located within the winding chambers alongside electrical conductors that pass through the winding chambers. The fiber is disposed through the winding chambers by looping it through substantially opposing sides of the stator. This permits the fiber to provide two parallel legs. Bending or deformation of the stator will place one of the opposing legs in tension and the other in compression. Optical discontinuities on each of the legs will be moved axially, and the detection of this relative axial movement allows measurement of bending or deformation of the stator. Placement of the fibers in this manner makes the fibers largely incapable of detecting certain operating parameters, such as temperature, since the fibers and their surrounding protective tubes are sealed within material that is largely insulative and precludes transfer of heat.

SUMMARY OF THE INVENTION

The present invention provides devices for detecting operational parameters associated with a motor that is used within an ESP. The operational parameters that are detected can include temperature, pressure, and vibration, viscosity, power and amperage. Optic fibers are used in conjunction with surface-based processing equipment that can record and store data provided by the optic fibers. In certain embodiments, optic fibers are used that provide for single point sensing or, alternatively, distributed multi-point sensing.

In described embodiments, optic fibers or fiber bundles are disposed along an axial pathway within unsealed portions of the motor, allowing for sensing of operational parameters. In certain embodiments, optic fibers or fiber optic bundles are located within a keyway that is formed within the inner diameter of the stator of the motor. In still other embodiments, fiber optic sensors are disposed either within or upon the shaft of the motor.

In each of the described embodiments, the optical fibers and/or fiber bundles are disposed in a largely axial orientation with respect to the motor. As a result, the fibers/fiber bundles are able to obtain data at one or more points along the axis of the motor. Conventional fiber optics methods are primarily used to detect operational parameters associated with the motor. According to the fiber Bragging method, Bragg gratings are formed at predetermined points along a fiber. Particular Bragg gratings are sensitive to changes in temperature while other Bragg gratings are sensitive to strain and can be used to measure vibration. In order to measure temperature, fiber Bragg gratings are preferably not exposed to significant external pressure. When used to measure vibration, fiber Bragg gratings should be attached to the equipment components.

In preferred embodiments, optic fibers or fiber bundles that are incorporated into the motor are passed through an epoxy fixture located at the lower end of the motor and, thereafter, into a fiber management bowl wherein the fibers can be spliced to join a fiber optic cable that leads to the surface of the well.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
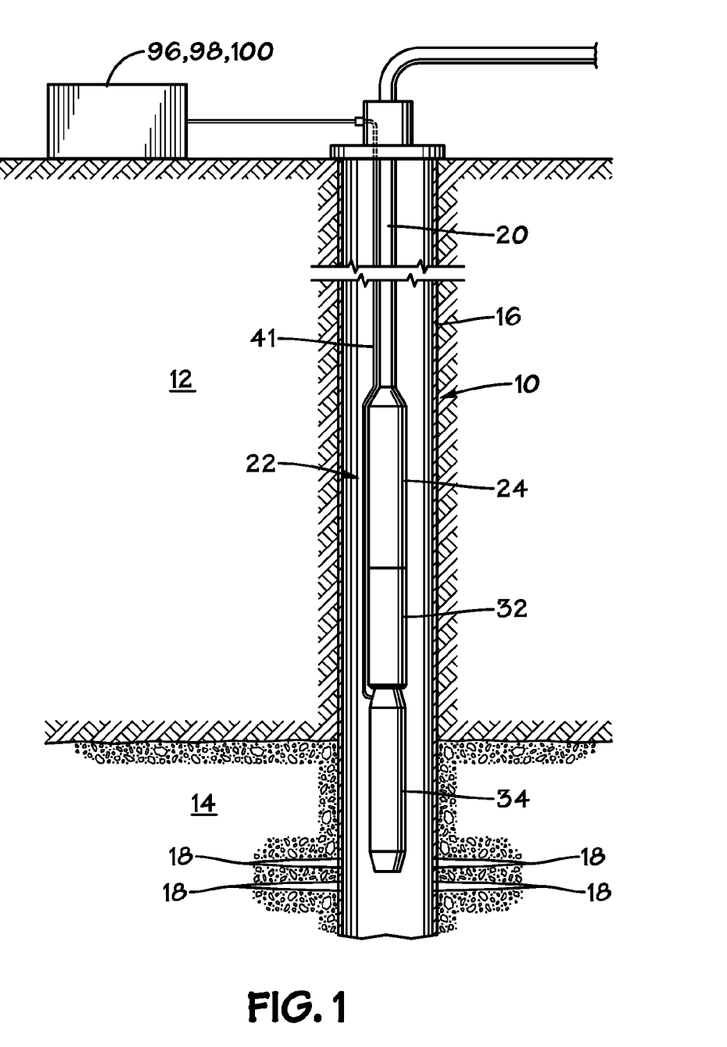
FIG. 1 is a side, cross-sectional view of an exemplary wellbore containing an electric submersible pump.

FIG. 1 depicts an exemplary wellbore 10 that has been drilled through the earth 12 down to a subterranean hydrocarbon formation 14. The wellbore 10 has metallic casing 16 of a type known in the art. Perforations 18 are disposed through the casing 16 and into the formation 14.

Production tubing 20 is disposed within the wellbore 10, having been run in from the surface in a manner known in the art. The production tubing 20 may be a string of production tubing members that are interconnected by threaded or it may be coiled tubing. An electric submersible pump (ESP) assembly 22 is affixed to the lower end of the production tubing 20.

The exemplary ESP assembly 22 includes a centrifugal pump 24 which is affixed at its lower end to either a seal 32 or a gas separator (not shown).

A seal section 32, of a type known in the art, interconnects the lower end of the pump 24 to a motor 34. The motor 34 is of a type known in the art and may be a three-phase electrical motor. The seal section 32 is also of a type known in the art and is capable of equalizing the pressure of the lubricant contained within the motor 34 with well fluid on the exterior of motor 34.

Further details relating to the construction and operation of electric submersible pump assemblies and gas separators can be found in U.S. Patent Publication No. US 2009/0065202 which is owned by the assignee of the present application. U.S. Patent Publication No. US 200910065202 is hereby incorporated by reference in its entirety.

Figure 2:
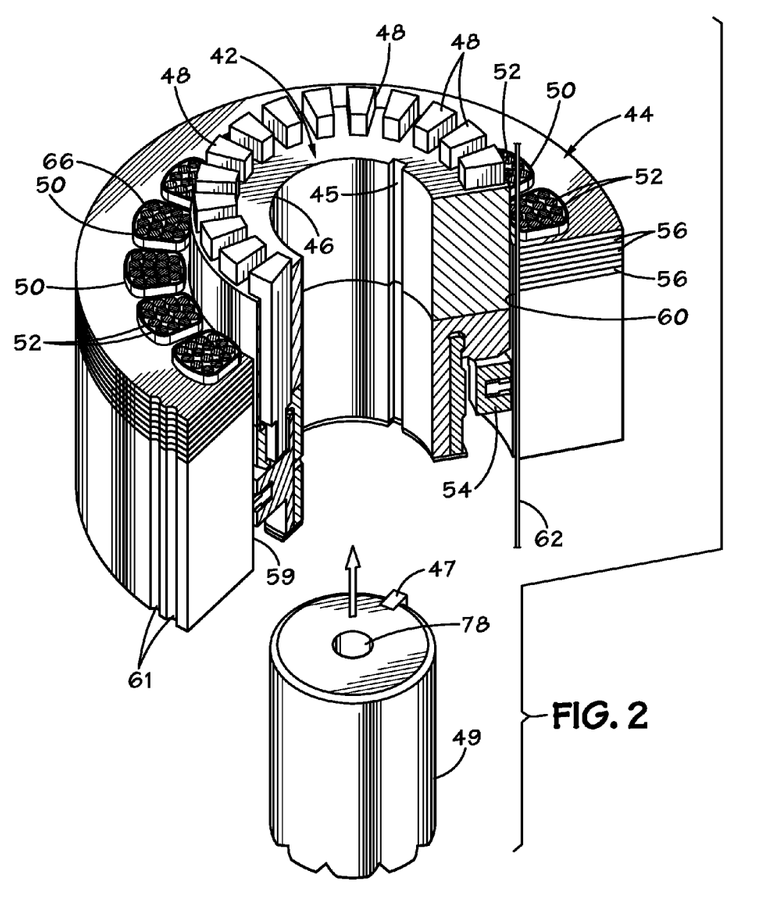
FIG. 2 is an isometric view of an exemplary downhole motor, partially cut away, and depicting an exemplary placement of fiber optics for measurement of vibration and temperature in accordance with the present invention.

FIG. 2 depicts internal portions of the motor 34. The motor 34 includes a central rotor 42 and a stator 44 that radially surrounds the rotor 42. During operation, the rotor 42 rotates with respect to the stator 44. The rotor 42 is generally cylindrical in shape and encloses a central bore 46. Magnetic elements 48, such as copper cores, are disposed within the rotor 42. Axial electric winding compartments 50 are formed within the stator 44 and contain wires 52 that form the winding. A rotary bearing 54 is provided between two rotors 42 or between shaft 49 and stator 44. The central bore 46 of the rotor 42 includes keyways 45 that are shaped and sized to be engaged by a complementary key 47 on rotary motor shaft 49. As is known, the motor shaft 49 is inserted into the central bore 46 of the rotor 42 (and a key 47 into keyway 45) and is rotated by the rotor 42 when the motor 34 is energized.

Figure 3:
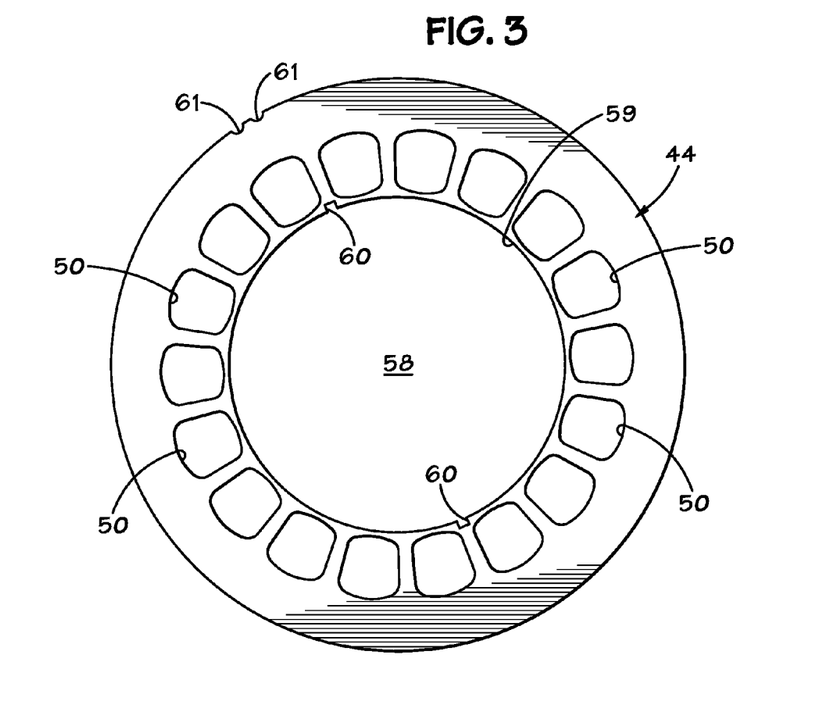
FIG. 3 is a top view of portions of an exemplary stator that is used with the motor shown in FIG. 2.
Figure 4:
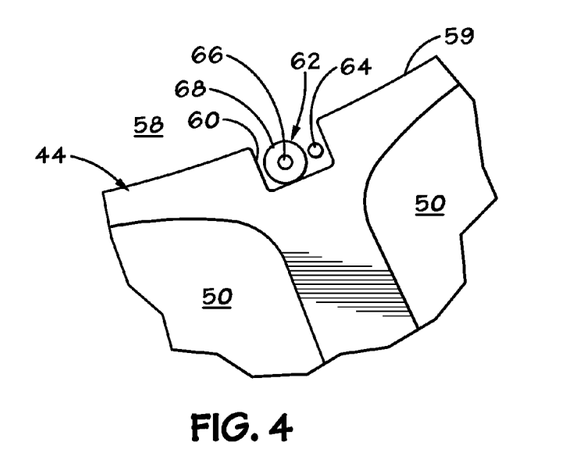
FIG. 4 is a detailed view of n exemplary keyway and optic fiber assembly used with the motor shown in FIG. 2.

It is noted that the stator 44 is typically formed of a number of thin plates, known as laminates 56 that are stacked and secured to each other. A central opening 58 is formed by the interior radial surface 59 of the stator 44. The rotor 42 is disposed within the central opening 58. Keyways 60 are formed within the stator 44 and open into the central opening 58. In particular embodiments, the keyways 60 have a U-shape and may have a width of about 0.070 inches and a depth of about 0.070 inches. FIGS. 3 and 4 provide top views of the stator 44 absent the wires 52 and show the keyways 60 more clearly. In particular embodiments, there are two keyways 60 formed within the stator 44. Axial grooves 61 are formed in the exterior radial surface of the stator 44.

An optic fiber bundle 62 is disposed in at least one of the keyways 60. FIG. 4 depicts an exemplary optic fiber bundle 62 which includes an optic fiber 64 that is used to detect vibration at one or more locations along the axial length of the stator 44. The bundle 62 preferably also includes an optic fiber 66 that is used to detect temperature at one or more locations along the axial length of the stator 44. In a preferred embodiment, the fiber 66 is surrounded by a protective tube 68. In particular embodiments, the protective tube 68 is formed of PEEK (polyether ether ketone) or a similar substantially rigid and resilient material.

To construct motor 34 having the optic fiber bundle 62 retained within the keyway 60, the individual laminates 56 are affixed to each other to form the stator 44 with keyway 60. Thereafter, the optic fiber bundle 62 is disposed within the keyway 60.

Figure 5:
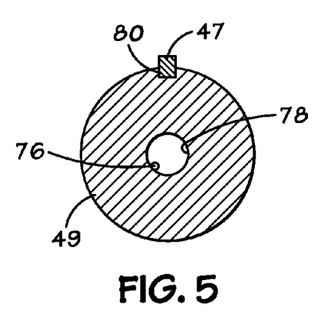
FIG. 5 illustrates the exemplary placement of an optic fiber within a motor shaft.
Figure 6:
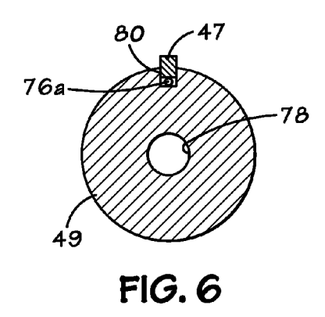
FIG. 6 is a depiction of exemplary placement of an optic fiber with respect to a motor shaft and key.
Figure 6A:
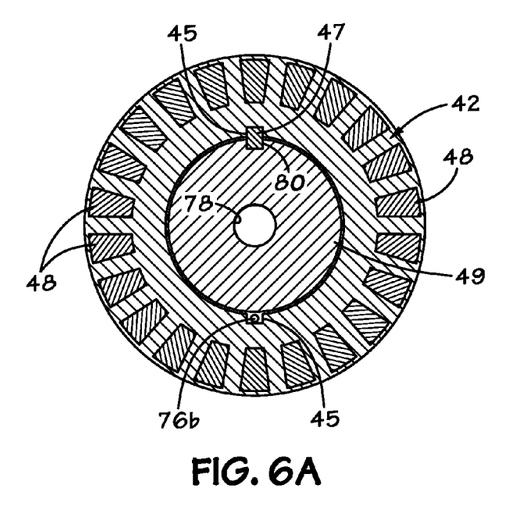
FIG. 6A depicts exemplary placement of an optic fiber in a rotor keyway.

FIGS. 5, 6 and 6A illustrate exemplary placements of an optic fiber or fiber bundle with respect to a motor shaft 49. FIG. 5 illustrates an optic fiber 76 which is located within the interior axial passage 78 of the motor shaft 49. FIG. 6 depicts an alternative arrangement wherein the fiber 76a is located within an axial keyway 80 that is formed within the outer circumference of the motor shaft 49.

FIG. 6A illustrates a further alternative arrangement wherein a fiber 76b is disposed within an unused keyway 45 in the rotor 42. In the depicted embodiment, there are two keyways 45 formed in the rotor 42 and which are located in diametrically opposite locations upon the rotor 42. One keyway 45 is used to have the key 47 located therein. The opposite keyway 45 is unused and therefore available to have fiber 76b contained therein.

Figure 7:
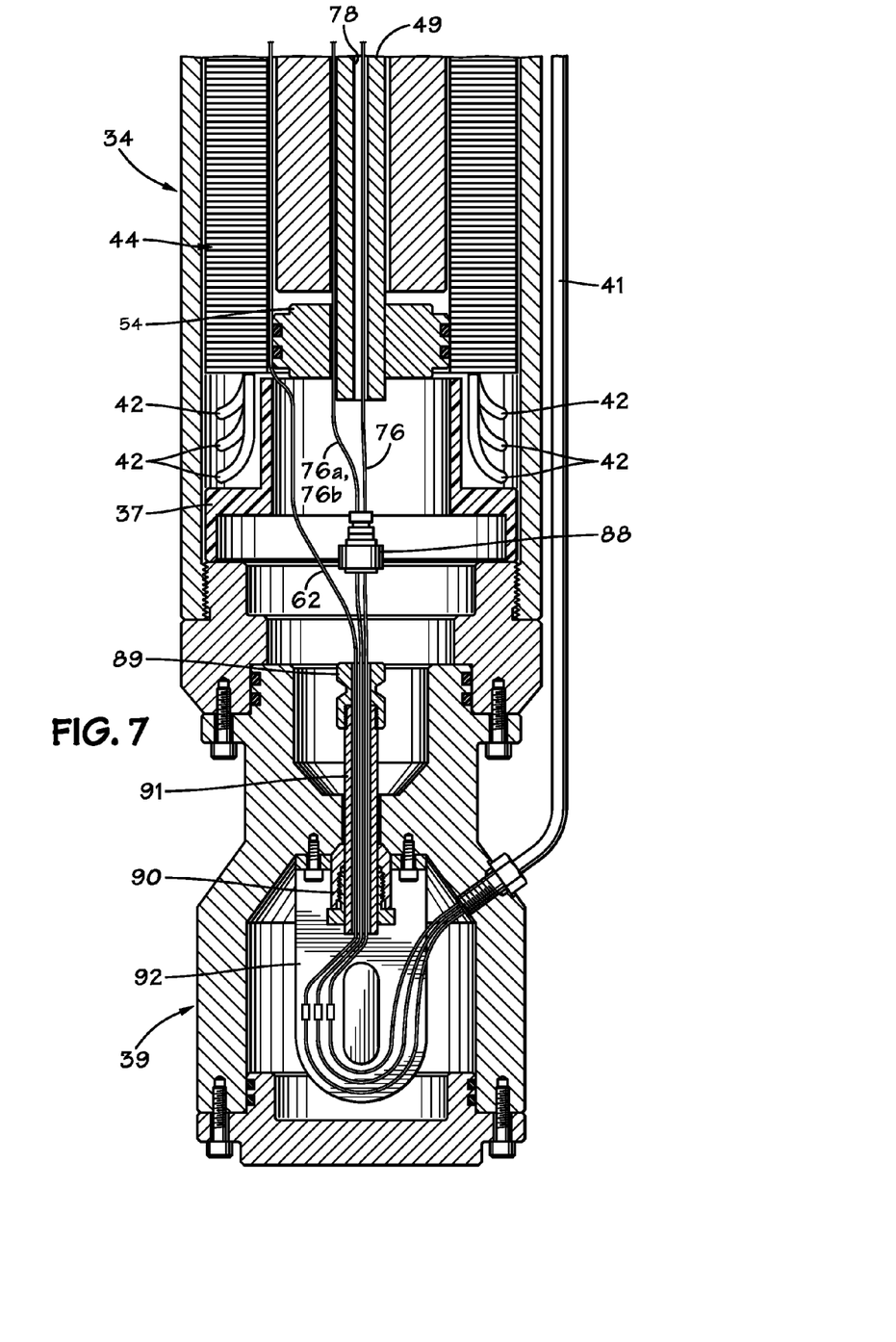
FIG. 7 illustrates the lower end of exemplary motor and associated components.

FIG. 7 depicts the lower end of the motor 34 which includes a cylindrical fixture 37. The fixture 37 is typically formed of epoxy and functions to collect and organize the motor power cables 42 while permitting the optic fibers/fiber bundles 62, 76 and 76a to pass through. Optic fibers/fiber bundles 76, 76a, 76b will tend to rotate during operation and are therefore disposed through a rotary fiber optic joint 88 below the fixture 37. Suitable rotary fiber optic joints for use in this application include fiber optic rotary joints which are available commercially from Moog Components Group of Halifax, Nova Scotia, Canada. CONAX™ fittings 89, 90 are affixed to rigid tubing 91 through which the fibers 76, 76a, 76b and 62 will pass from the motor 34 to fiber management bowl 39 below.

The fiber management bowl 39 contains a splice tray 92 which permits the individual fibers or fiber bundles to be spliced and incorporated into fiber optic cable 41 which will extend to surface-based equipment. A suitable fiber management bowl for use in this application is the SUREVIEW™ ESP Optical Stinger that is available commercially from Baker Hughes Incorporated of Houston, Tex.

Figure 8:
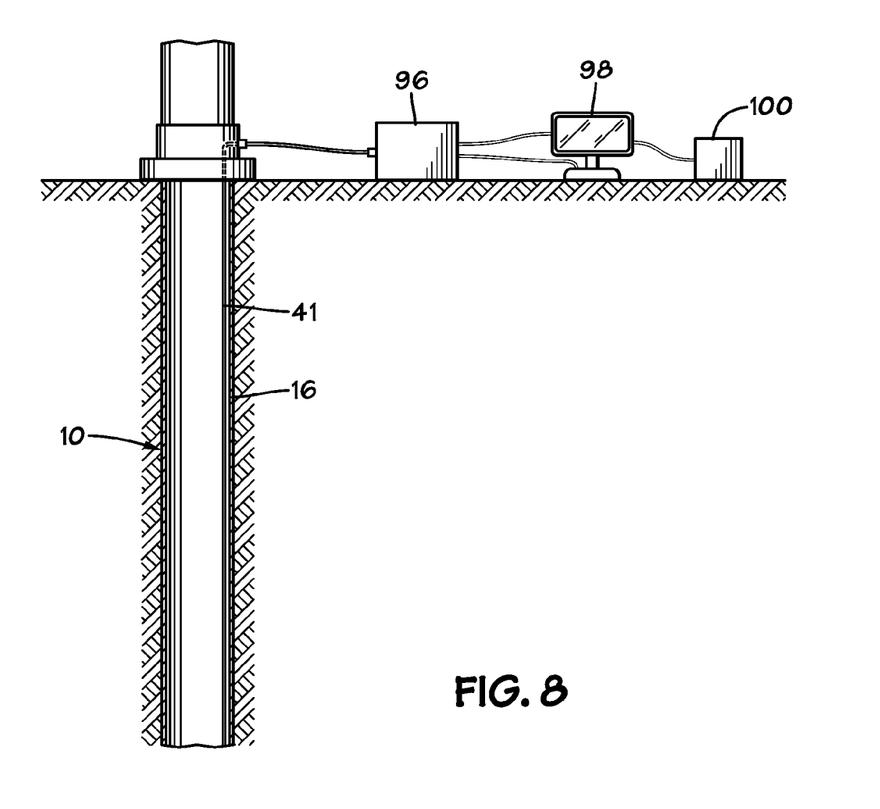
FIG. 8 illustrates surface-based equipment that is operably associated with fiber optic sensors.

FIG. 8 illustrates exemplary surface-based equipment to which the fiber optic cable 41 might be routed. The fiber optic cable 41 is operably interconnected with a fiber optic signal processor 96. In some embodiments, a suitable display 98 and recording device 100 are also associated with the signal processor 96. Generally, the fiber optic signal processor 96 includes a computer or microprocessor chip that is programmed to analyze an optical signal and send information relating to the optical signal to recordable storage in the recording device 100. The fiber optic signal processor 96 typically includes an optical time-domain reflectometer (OTDR) which is capable of transmitting optical pulses into the fiber optic cable 41 and analyzing the light that is returned, reflected or scattered therein. Changes in an index of refraction in the optic fibers 62, 76, 76a, 76b can define scatter or reflection points. Analyzing the collected return light can yield the distance to changes n the index of refraction. Thus, the OTDR can be used to detect the locations of sensed operating parameters along the length of the optic fibers 62, 76, 76a, 76b.

It is noted that each of the optic fibers/fiber bundles 62, 76, 76a and 76b may be used to detect an operational parameter associated with the motor 34. The operational parameters that are detected can include temperature, pressure, and vibration. In certain embodiments, optic fibers are used that provide for single point sensing or, alternatively, distributed multi-point sensing. In particular embodiments, Bragg gratings are provided along the length of the optic fibers.

Figure 9:
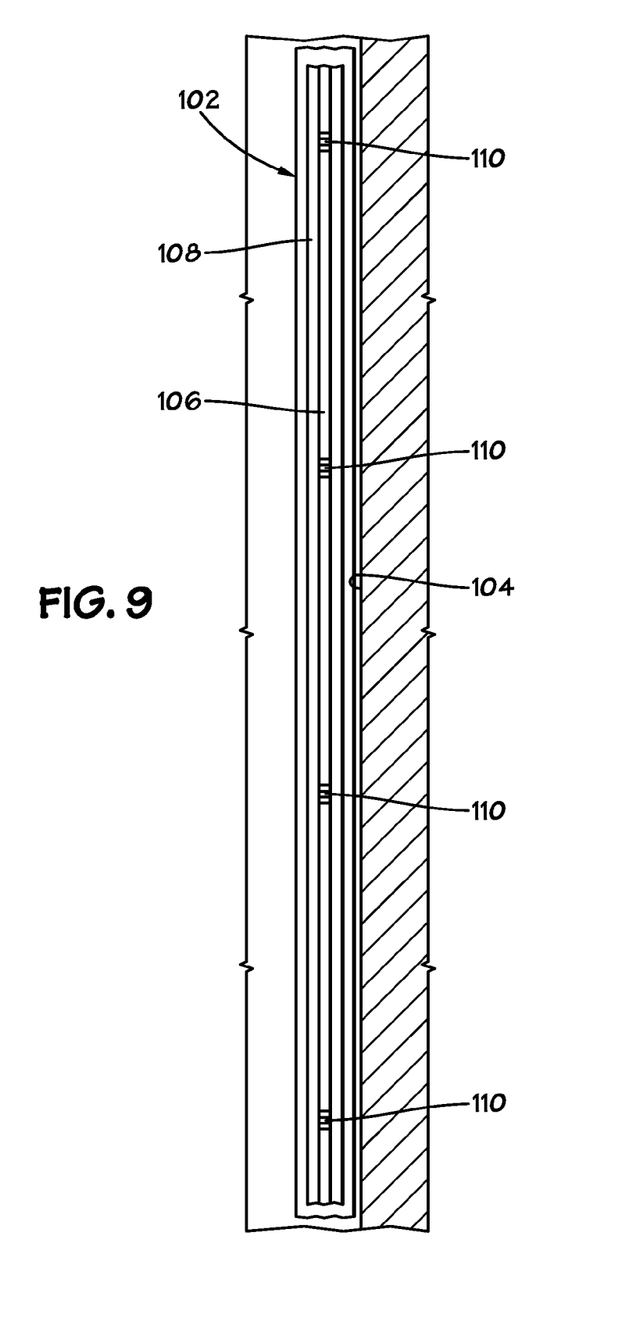
FIG. 9 illustrates an arrangement of Bragg grating along an optic fiber useful for detection of operational parameters within a motor.

FIG. 9 illustrates an exemplary optic fiber 102 which is disposed along an axial pathway 104. The exemplary optic fiber 102 may represent any of the fibers 62, 76, 76a, 76b discussed previously. The axial pathway 104 may represent any of the keyway 60 or the axial passage 78 or the keyways 45, 80 of the motor shaft 49. The optic fiber 102 includes a core 106 that is radially surrounded by cladding 108. Bragg gratings 110 are formed on the core 106 of the fiber 102. Bragg gratings 110 may be created using UV laser or UV light in conjunction with a specific photomask to form a particular grating pattern. Each Bragg grating 110 functions as a sensor that exhibits particular resonance feature which is tracked as the fiber is subjected to strain or to temperature variations. Each Bragg grating 110 responds to a broadband optical signal (typically provided by the signal processor 96) and further responds to the parameter being sensed, in order to provide a signal containing information about the parameter being sensed. As an optical pulse is provided to the fiber 102 by the signal processor 96, light is continuously backscattered as it propagates, as a result of Rayleigh scattering. The backscattered light is time-resolved by the signal processor 96 to provide a differential map of the spatial distribution of optical attenuation along the fiber 102. In certain embodiments, there are multiple Bragg gratings 110, which permits a selected parameter to be measured at multiple, discrete points along the length of the axial pathway 104. In a particular exemplary embodiment, temperature is detected by each of the Bragg gratings 110 along the fiber 102, which will provide to an operator an indication of discrete hot spots along the axial length of the axial pathway 104. In one example, excessive heating on the interior or radial exterior of the motor shaft 49 can be detected using optic fibers 76, 76a, and/or 76b. The optic fiber 62 can detect heating caused, for example, by binding or excessive friction between the rotor 42 and stator 44 as the rotor 42 is rotated within the stator 44. The use of multiple Bragg gratings 110 also allows the axial position of this heating to be determined as well.

According to an alternative embodiment, the Bragg gratings 110 are adapted to detect pressure or changes in pressure in the area proximate the pathway 104. The sensed data will provide an indication of the locations(s) of high pressure areas along the length of the pathway 104. According to a particular example, excessive fluid pressure of lubricant oil disposed between the rotor 42 and stator 44 can be detected by the optic fiber 62. Additionally, excessive fluid pressure within or surrounding the motor shaft 49 can be detected by fibers 76, 76a, 76b.

According to a further alternative embodiment, the Bragg gratings 110 are adapted to allow detection of strain on the fiber 102. Discrete distributed point measurements of strain along the length of the axial pathway 104 can provide indications of vibration within the motor 34 and provide the locations of excessive vibration within the motor 34. In particular examples, the fibers 62, 76, 76a, 76b could reveal points of excessive vibration or the misalignment of components within the motor 34, which could be subsequently corrected.

The invention provides motor assemblies that incorporate fiber optic sensors that are disposed axially within unsealed portions of the motor 34 in order to detect one or more operational parameters associated with the motor 34. In particular embodiments, optic fibers are disposed within an axial keyway 60 that is formed within the interior radial surface of a stator 44. In other particular embodiments, optic fibers are disposed within an interior axial passage 78 of the motor shaft 49 and/or within a keyway 80 formed on the radial exterior of the motor shaft 49.

It should be appreciated that the invention provides devices that allow monitoring of operational parameters of a subsurface motor especially in high temperature applications. The inventors have found that fiber optics are relatively insensitive to electromagnetic interference and have a small footprint and high accuracy.

Those of skill in the art will recognize that numerous modifications and changes may be made to the exemplary designs and embodiments described herein and that the invention is limited only by the claims that follow and any equivalents thereof.

What is claimed is:

1. A subsurface motor for a submersible pump, the motor comprising:
    a stator having a generally cylindrical body with a central opening and a plurality of stator winding compartments which contain winding wire conductors;
    a rotor that is rotatable within the stator;
    a housing that encloses the rotor and stator;
    a motor shaft that is rotated by the rotor; and
    an optic fiber sensor that is disposed through the central opening and does not pass through a stator winding compartment, the optic fiber sensor being disposed within at least one of: an axial keyway formed within an outer radial surface of the motor shaft or an interior axial passage within the motor shaft.

2. The subsurface motor of claim 1 wherein the optic fiber sensor is operably associated with data processing equipment.

3. The subsurface motor of claim 1 wherein the optic fiber sensor is disposed within a protective tube.

4. The subsurface motor of claim 1 wherein the optic fiber sensor is adapted to detect at least one operating parameter from the group of operating parameters from the group consisting essentially of temperature, pressure and strain.

5. A subsurface motor for a submersible pump, the motor comprising:
    a stator having a generally cylindrical body with central opening and a plurality of stator winding compartments which contain winding wire conductors;
    a rotor that is rotatable within the stator;
    a housing that encloses the rotor and stator;
    a motor shaft that is rotated by the rotor;
    an optic fiber sensor that is disposed through the central opening and does not pass through a stator winding compartment, the optic fiber sensor being disposed within at least one of: an axial keyway formed within an outer radial surface of the motor shaft or an interior axial passage within the motor shaft; and
    wherein the optic fiber sensor is operably associated with data processing equipment.

6. The subsurface motor of claim 5 wherein the optic fiber sensor is disposed within a protective tube.

7. The subsurface motor of claim 5 wherein the optic fiber sensor is adapted to detect at least one operating parameter from the group of operating parameters from the group consisting essentially of temperature, pressure and strain.

8. A subsurface motor for a submersible pump, the motor comprising:
    a stator having a generally cylindrical body with a central opening and a plurality of stator winding compartments which contain winding wire conductors;
    a rotor that is rotatable within the stator;
    a housing that encloses the rotor and stator;
    a motor shaft that is rotated by the rotor;
    an optic fiber sensor that is disposed through the central opening and does not pass through a stator winding compartment, the optic fiber sensor being disposed within at least one of: an axial keyway formed within an outer radial surface of the motor shaft or an interior axial passage within the motor shaft; and
    wherein the optic fiber sensor is adapted to detect at least one operating parameter from the group consisting essentially of temperature, pressure and strain.

9. The subsurface motor of claim 8 wherein the optic fiber sensor is operably associated with data processing equipment.

10. The subsurface motor of claim 8 wherein the optic fiber sensor is disposed within a protective tube.

* * * * *